US006906890B2

(12) United States Patent
Gavit et al.

(10) Patent No.: US 6,906,890 B2
(45) Date of Patent: Jun. 14, 2005

(54) DATA STORAGE TAPE CARTRIDGE WITH AIR FILTER, TAPE TRANSPORT APPARATUS AND METHODOLOGY UTILIZING THE SAME

(75) Inventors: Stephan E. Gavit, Littleton, CO (US); K. John Stahl, Littleton, CO (US)

(73) Assignee: Segway Systems, LLC, Littleton, CO (US)

( * ) Notice: Subject to any disclaimer, the term of this patent is extended or adjusted under 35 U.S.C. 154(b) by 303 days.

(21) Appl. No.: 10/152,279

(22) Filed: May 21, 2002

(65) Prior Publication Data

US 2003/0218825 A1 Nov. 27, 2003

(51) Int. Cl.[7] ................................................ G11B 3/58
(52) U.S. Cl. ........................................................ 360/93
(58) Field of Search .......................... 360/93, 132, 134, 360/128, 92

(56) References Cited

U.S. PATENT DOCUMENTS

| | | |
|---|---|---|
| 5,197,056 A | 3/1993 | Van Heusden et al. |
| 5,349,713 A * | 9/1994 | Stimpfl ........................ 15/1.51 |
| 5,737,153 A | 4/1998 | Gavit |
| 5,739,970 A | 4/1998 | Kobayashi et al. |
| 5,777,823 A | 7/1998 | Gavit |
| 6,078,478 A | 6/2000 | Gavit |
| 6,219,201 B1 * | 4/2001 | Vaaler ........................ 360/132 |
| 6,345,779 B1 | 2/2002 | Rambosek |
| 6,587,307 B1 * | 7/2003 | Raymond et al. ........... 360/137 |

FOREIGN PATENT DOCUMENTS

JP 04310684 A * 11/1992 ......... G11B/23/087

* cited by examiner

*Primary Examiner*—David Ometz
*Assistant Examiner*—Mark Blouin
(74) *Attorney, Agent, or Firm*—Timothy J. Martin; Michael R. Henson; Rebecca A. Gegick

(57) ABSTRACT

A data storage tape cartridge used in a tape transport apparatus that incorporates air bearing technology is provided. The tape cartridge includes a housing for storing the data storage tape and a compressible filter. The filter is located proximate to an opening, or air inlet, that is in communication with the housing interior. The housing may also have a second opening, or air outlet, in communication with the housing interior such that the filter is interposed between the inlet and the outlet. Further, the housing may include a storage region to retain the filter in the compressed state. The filter and the storage region may have congruent geometries. A method of supplying filtered air to a tape transport apparatus is also provided. The method contemplates drawing ambient air through the filter and passing it directly through the outlet opening for use by the tape transport apparatus.

8 Claims, 6 Drawing Sheets

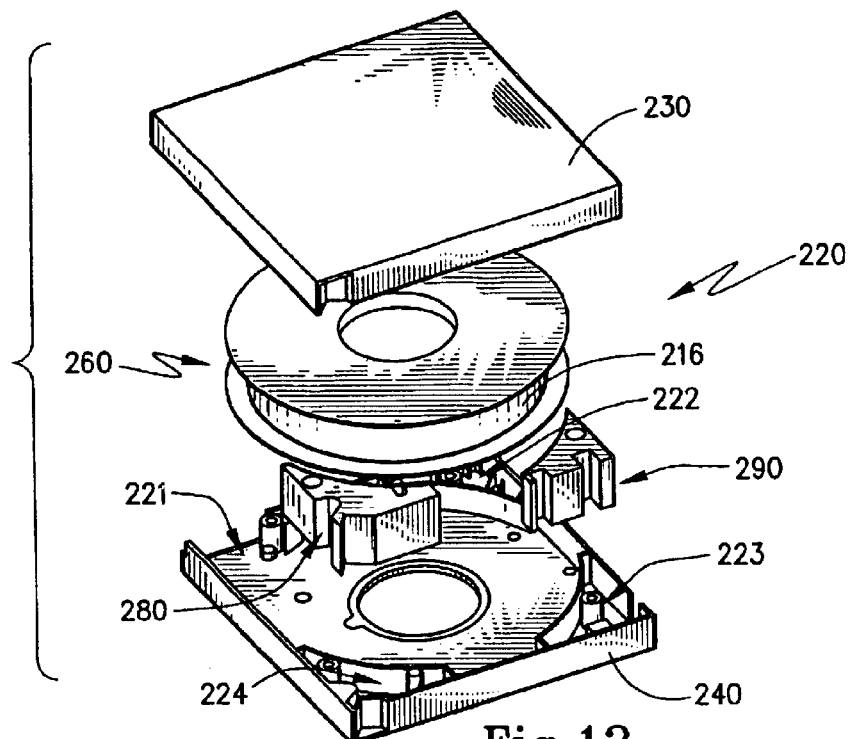
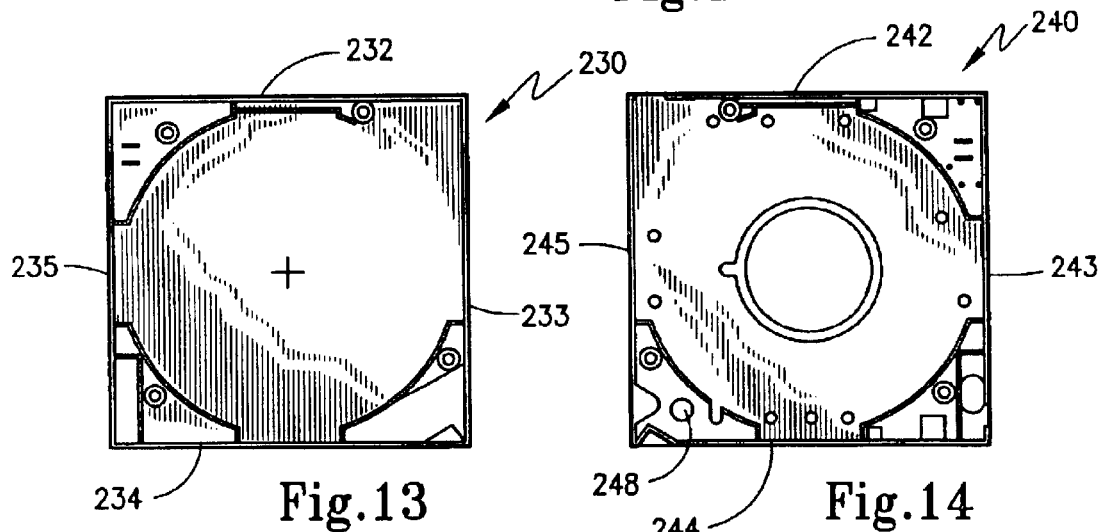
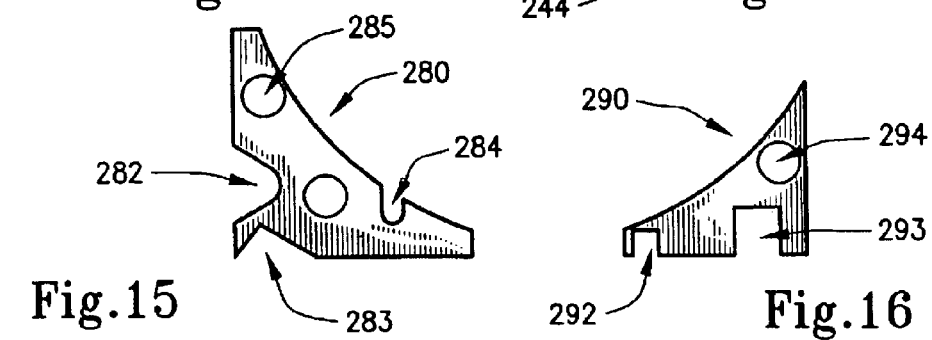

DATA STORAGE TAPE CARTRIDGE WITH AIR FILTER, TAPE TRANSPORT APPARATUS AND METHODOLOGY UTILIZING THE SAME

FIELD OF THE INVENTION

The present invention broadly concerns electronic recording devices employed in the data storage industry, and more particularly concerns data storage tape cartridges for use in tape transport apparatuses which operate to support a band of tape on a cushion of air as it is transported through the apparatus across a read/write recording head. The present invention is even more specifically directed to air filtration techniques for those tape transport apparatuses which pass filtered air through air bearings to create air bearing surfaces across which the data storage medium is translated.

BACKGROUND OF THE INVENTION

The advent of the information age has seen an exponential growth in the accumulation and storage of data, and various types of devices have been developed to store data both or on-line usage as well as for archival purposes. In the early days of the computer, before the advent of magnetic disk and optical storage assemblies, data was typically stored on magnetic tapes, such as reel-to-reel tapes and later cassettes. In a magnetic tape transport apparatus, a magnetic coil is used as a transducer to imprint data magnetically on a moving band of magnetic film. Thereafter, when the film is advanced across the transducer, the data may be read and re-input into a processor. A typical data storage tape cartridge for use in a magnetic tape transport apparatus incorporates a housing having a base and a cover which may be secured in a number of ways including screws and sonic welding, and a tape reel assembly supported by the housing and incorporating a central hub about which the magnetic tape is wound. The housing itself is sized for insertion into a typical tape drive such that it may be used with a 5.25—inch form factor drive, a 3.5—inch form factor drive or other known sizes.

Magnetic tape has an advantage in that it is relatively low in cost and can be erased and rewritten many times. While other types of data storage media, such as optical disks and laser disks, have been developed in an effort to increase the density of stored data, magnetic tape remains a highly desirable format for archiving data in situations where the ability to radially access the data is of less significance, yet where cost remains a concern. Nonetheless, as the insatiable demand for data storage and retrieval grows, the magnetic tape industry has had to at least keep pace with advances in other types of data storage industries in order to remain competitive. For example, thinner bands of tape are being employed to optimize the surface area of media that may be stored within a given cartridge. Further, efforts are being made to record more data per unit area of the tape surface by increasing the number of tracks per unit width and the number of bytes per unit length. U.S. Pat. No. 6,078,478 issued Jun. 20, 2000 illustrates one approach which particularly concerns the controlled movement of a read/write head along a linear axis which may be used to increase the density of recorded data on a magnetic tape recording medium by increasing the plurality of tracks that are made on the medium. Other strides have been made for those tape drives which utilize air bearing technology to float recording tape on a thin cushion of air as it is translated across the read/write transducer of a tape transport apparatus. While a prevalent technology still found in many products such as the IBM 3480/3490/3590 family of tape drives, forces pressurized air through small drilled holes in the bearing surface, U.S. Pat. No. 5,777,823, issued Jul. 7, 1998 teaches an improved approach to air bearing technology which eliminates the disadvantages attendant with individually drilling ports through bearing surfaces As industry demands increase, other advances will likely be made to improve the technology in this field. It has heretofore, however, not been known to significantly modify or otherwise alter the air filtration techniques employed in conjunction with tape drive apparatuses, particularly magnetic tape drive apparatuses which utilize air bearing technology. Such systems require filtration of the inlet air to prevent contamination from the operating environment. It is known to use an external air pump for the purpose of creating the air pressure and flow required to float the magnetic tape satisfactorily as it is translated through the drive across the read/write transducer between the data tape storage cartridge and a take-up reel. To provide adequate filtration, ambient air is typically drawn by the pump through an associated air filter before being pressurized and sent to the air bearing surfaces. However, due to the airflow rate requirements of larger form-factor tape drives, these rotary vane pumps are relatively large and expensive and they, as well as their associated filters, cannot be integrated into the space confinements of the tape drive. The result is a more bulky and expensive air filtration system, and these drawbacks have been exacerbated because the large and expensive rotary vane pumps traditionally employed will, for various reasons, become incompatible or inadequate with small form-factor tape drives that are the wave of the future. Further, since traditional rotary vane pumps have internal filters, which are used many times during use of the tape transport apparatus, a proper maintenance schedule entails the need to periodically replace these filters to help prolong operability of the tape transport apparatus as well as integrity of magnetic tape media.

Ideally, then, it is desirable to design a system which not only provides adequately filtered air to guide the band of tape medium across the air bearing surface while preventing contamination from the operating environment, but to also minimize the size, power and cost of the air pump associated with such air filtration systems. Accordingly, despite the various advances made in other aspects of magnetic tape transport apparatuses, there remains a need for addressing the air filtration side of the technology to keep pace with both and future demands of the industry. It has surprisingly been found that modifications can be made to conventional magnetic tape storage cartridges to fulfill these needs.

SUMMARY OF THE INVENTION

An object in the invention is to provide a new and improved data storage tape cartridge that is adapted to be mounted in and demounted from a tape transport apparatus.

Another object of the present invention is to provide such a data storage tape cartridge which is particularly useful as a component in an air filtration system associated with a tape transport apparatus.

Yet another object of the present inventions is to provide a data storage tape cartridge which is easy to fabricate, comparably priced relative to known data storage tape cartridges, yet which contributes to a reduction in the overall cost, size and number of components needed to provide adequate air filtration in a tape transport apparatus.

Still a further object of the present invention is to provide a new and improved tape transport apparatus that is adapted to receive a tape medium and to transport the tape medium in a transport direction in order to read/write data thereon.

Yet a further object of the present invention is to provide a method of supplying filtered air to such a tape transport apparatus, and particularly one which employs air bearing technology for providing a cushion of air across which a magnetic tape medium is translated.

In order to accomplish these objects, then, the present invention is in one sense directed to a data storage tape cartridge adapted to be mounted in and demounted from a tape transport apparatus. The tape cartridge broadly comprises a housing having a first opening formed therethrough in communication with the housing's interior, a filter disposed in the housing interior proximate to the first opening, and a data storage tape stored in the housing interior. The housing may include opposed top and bottom panels and a surrounding sidewall extending therebetween to define the housing interior. The filter, which may be a compressible member, is preferably retained within the housing interior in a storage region located adjacent to the housing's sidewall. The filter and this storage region may have congruent geometries.

Another opening may also be formed through the housing in communication with the housing interior, with the filter interposed between the first and second openings.

One of these openings serves as an air inlet and is preferably formed by an air inlet port extending through a first wall of the housing, with the other opening serves as an air outlet and is formed by an outlet port extending through a second wall of the housing. These housing walls may be parallel to one another with the inlet and outlet ports extending in opposed, facing relationship; alternatively, the first and second walls of the housing and their respective inlet and outlet ports may extend transversely to one another. In either case, the air filter preferably includes a first filter surface disposed proximately to the air inlet port in facing relationship to the first wall and a second filter surface disposed proximately to the air outlet port in facing relationship to the second wall.

A preferred form of the data storage tape cartridge of the present invention has a housing which includes first and second housing sections in the form of a cover piece and a base piece, which are operatively connected to one another, such as through screws, sonic welding, a snap-fit engagement, or the like, to define the housing interior. A tape reel assembly having an associated central hub is also preferably provided, about which the data storage tape is wound. A tape access window is preferably formed through the housing and a leader block assembly is secured to a free end of the data storage tape and supported within the housing interior proximate to the tape access window.

Each of the cover and base pieces may be rectangularly configured from a rigid, plastic material to include associated panels and associated sidewalls projecting therefrom. The respective sidewalls of the cover piece and the base piece are configured to cooperate with one another to form a surrounding sidewall for the housing. The air inlet may be defined by the tape access window or by an associated inlet port formed through the housing sidewall. The air outlet may be formed through a first corner region of the housing adjacent to the tape access window when the tape access window serves as the air inlet. Alternatively, the inlet and outlet ports are formed through the same corner region of the housing with the filter being sandwiched therebetween in its compressed state. Where this construction is used, the air inlet port may be formed through the cover panel and the air outlet port formed through the base panel such that they are in opposed relationship to one another. Alternatively, the inlet and outlet ports may be formed through adjacent sidewall portions of the housing, such as at respective first and second junctures of the cover piece and the base piece, whereby the ports extend transversely to one another. Preferably also, a spool boundary wall is disposed within the housing interior and includes at least one boundary wall portion extending arcuately between adjacent portions of the housing sidewall to define a generally triangular storage cavity within which the filter is received.

The present invention also provides a tape transport apparatus adapted to receive a tape medium and to transport the tape medium in a transport direction in order to read/write data thereon. Associated with the apparatus is a transducer operative to read/write data on the tape medium, a plurality of air bearings each positioned on a respective side of the transducer and having a respective air bearing surface, and a tape cartridge, such as discussed above, for storing the tape medium. The tape transport apparatus also includes an air pump interposed in fluid communication between the tape cartridge's outlet port and each respective air bearing surface. The pump operates to draw ambient air through the filter via an appropriate air inlet to produce filtered air which is directed to each respective air bearing surface to provide a cushion of air. A tape drive operates to advance the tape medium in the transport direction across the air bearings and the transducer such that the tape medium is supported on the cushion of air.

The tape transport apparatus may also include a base plate for supporting the tape cartridge, with the base plate having an air passageway formed therethrough which is adapted to be placed in fluid communication between the outlet port and the pump when the tape cartridge is in a docked state. A seal element, which may be an O-ring, is disposed in this passageway to provide sealing engagement between the base plate and the outlet port when the tape cartridge is docked. The tape transport apparatus may additionally include a plurality of airflow conduits interconnecting the air pump in fluid communication between the outlet and each respective air bearing surface.

The present invention also contemplates a methodology for supplying filtered air to such a tape transport apparatus. Broadly the method comprises drawing ambient air through a filter disposed within the data storage tape cartridge to produce filtered air, and directing the filtered into an interior of the tape transport apparatus. The methodology more specifically contemplates directing the filtered through each respective air bearing surface to produce the cushion of air. Preferably, the filtered air is pressurized with an air pump and passed into a plenum chamber before it is directed through each respective air bearing surface.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 12 is an exploded perspective view of another exemplary embodiment for a data storage tape cartridge of the present invention, and showing two alternative filter configurations which may be used therewith;

FIG. 13 is a plan view showing the inside for the cover piece of the data storage tape cartridge shown in FIG. 12;

FIG. 14 is a plan view showing the inside of the base piece for the data storage tape cartridge of FIG. 12;

FIG. 15 is a top plan view of one of the air filters shown in FIG. 12; and

FIG. 16 is a top plan view of another of the air filters shown in FIG. 12.

DETAILED DESCRIPTION OF THE EXEMPLARY EMBODIMENTS

The present invention is broadly directed in one sense, to data storage tape cartridges for use in the data storage industry. The data storage tape cartridge is adapted for use in a tape transport apparatus that is operative to transport a tape medium in a transport direction across read/write transducer in order to either place or access data on the tape. The data storage tape cartridge is particularly suited for use in such a tape transport apparatus which requires air filtration to prevent contamination from the operating environment. Accordingly, while the present invention in its various forms is described specifically with respect to magnetic tape media and tape transport apparatuses useful therewith, it should be understood that the principals described herein may be employed with other types of media and apparatuses. Moreover, the term "read/write transducer" as used herein may refer to a write transducer, a read transducer or a transducer that is capable of performing both reading and writing functions.

In its exemplary application, the present invention is even more specifically directed to a data storage tape cartridge used in a tape transport apparatus which incorporates air bearing technology for providing a cushion of air along a bearing surface so that the tape medium may be supported on the cushion of air as it moves in the transport direction.

Figure 1:
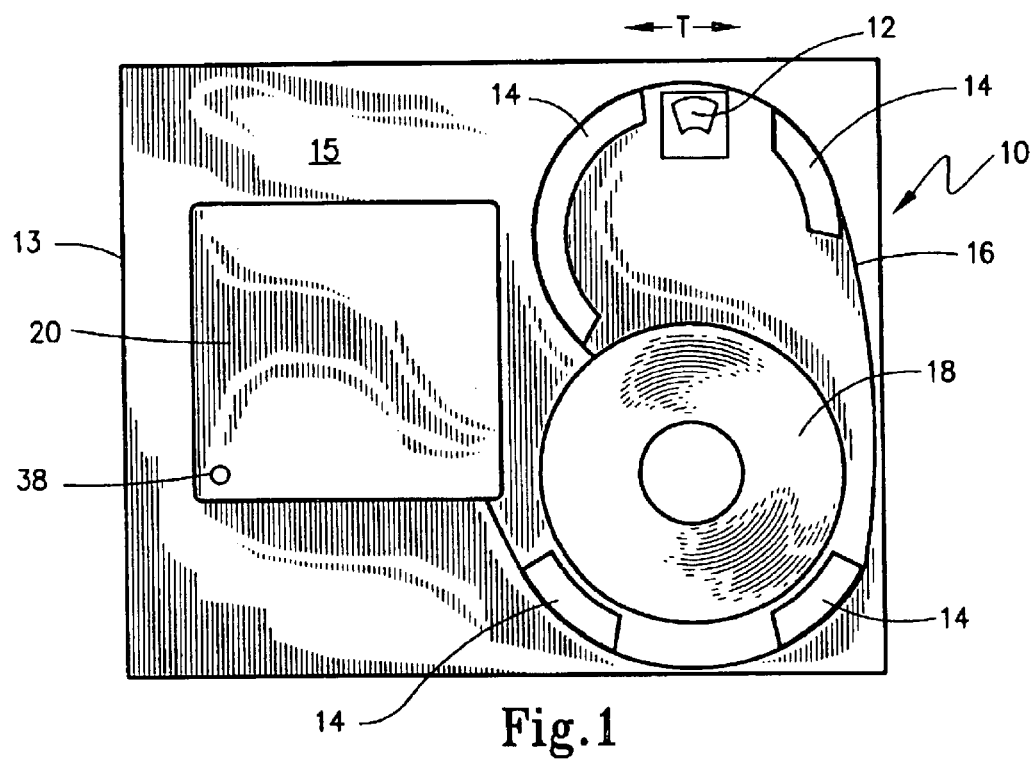
FIG. 1 is a top plan view showing a diagram of a tape transport apparatus according to the present invention.
Figure 2:
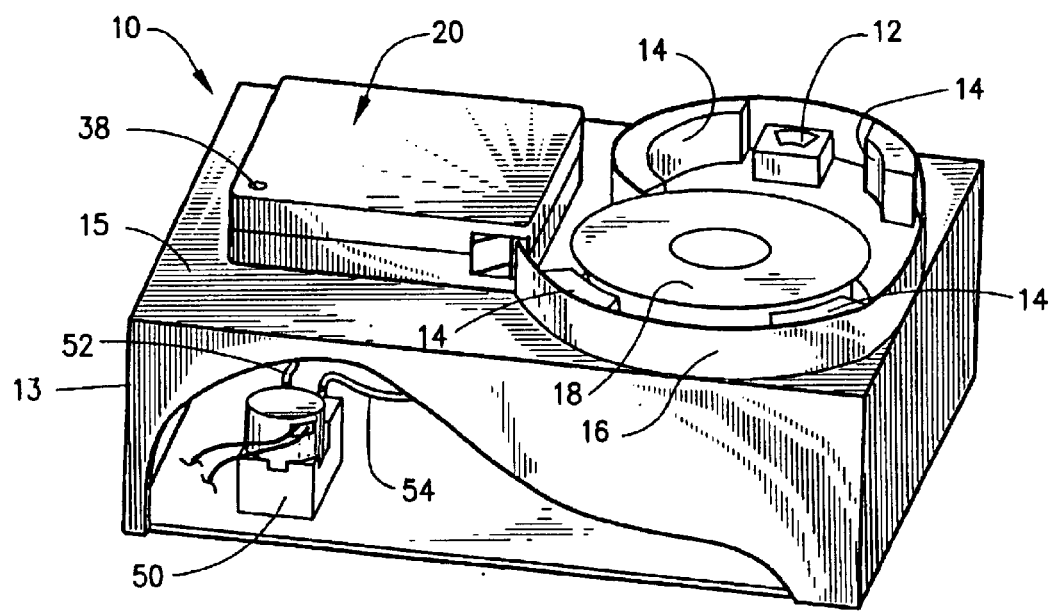
FIG. 2 is a perspective view of the tape transport apparatus, as diagrammatically shown in FIG. 1.

With this in mind, a diagram of a representative tape transport apparatus is shown in FIGS. 1 and 2. Here, tape transport apparatus 10 has an associated framework 13 which may include a base plate 15 upon which various ones of the components for tape transport apparatus 10 are supported. It should be understood that framework 13 illustrated in FIGS. 1 and 2 is for representative purposes only and that it could take on any of a variety of different structural configurations as determined by the particular form factor requirements of a given system. Tape transport apparatus 10 includes a read/write transducer 12 and a plurality of air bearings 14 which support a tape 16 for transport in a tape transport direction "T". More particularly, one or more suitable tape drive assembly (not shown), as known in the art, are provided once the band of tape medium 16 has been captured from its associated data storage tape cartridge 20 to selectively wind and unwind the tape medium 16 about a take-up reel 18 during use.

In order to provide pressurized air to air bearings 14, and thereby create cushions of air along air bearing surfaces upon which the tape medium 16 is translated during use, a suitable pump 50 is provided which operates to draw ambient air through the pump's inlet line 52 and create pressurized air along an outlet line 54 which can be appropriately directed to air bearings 14 in a manner also known in the art. To this end, where tape transport apparatus 10 is a 5¼" full height form factor tape drive, pump 50 is preferably a suitable diaphragm pump, such as Model No. A.1C25N1.C12VDC-P or Model No. B.C80E1.A12C134d, each available from Hargraves Technology Corp. of Mooresville, Ind. It should be appreciated, however, that the tape transport apparatus 10 as shown in FIGS. 1 and 2 is for illustrative purposes only and that the principal features of the present invention can be employed with a variety of different types of tape drives and associated media formats wherein a recording medium travels adjacent a read/write transducer. For example, tape transport apparatus 10 may be a linear-type tape transport apparatus having air bearings such as that taught in U.S. Pat. No. 5,777,823 to Gavit, dated Jul. 7, 1998, the disclosure of which is incorporated herein and reference. Indeed, as will be appreciated from the description to follow, the tape transport apparatus 10 can more broadly be regarded as one which utilize air filtration to prevent contamination from the operating environment, regardless of whether air bearing technology is specifically employed.

Figure 3:
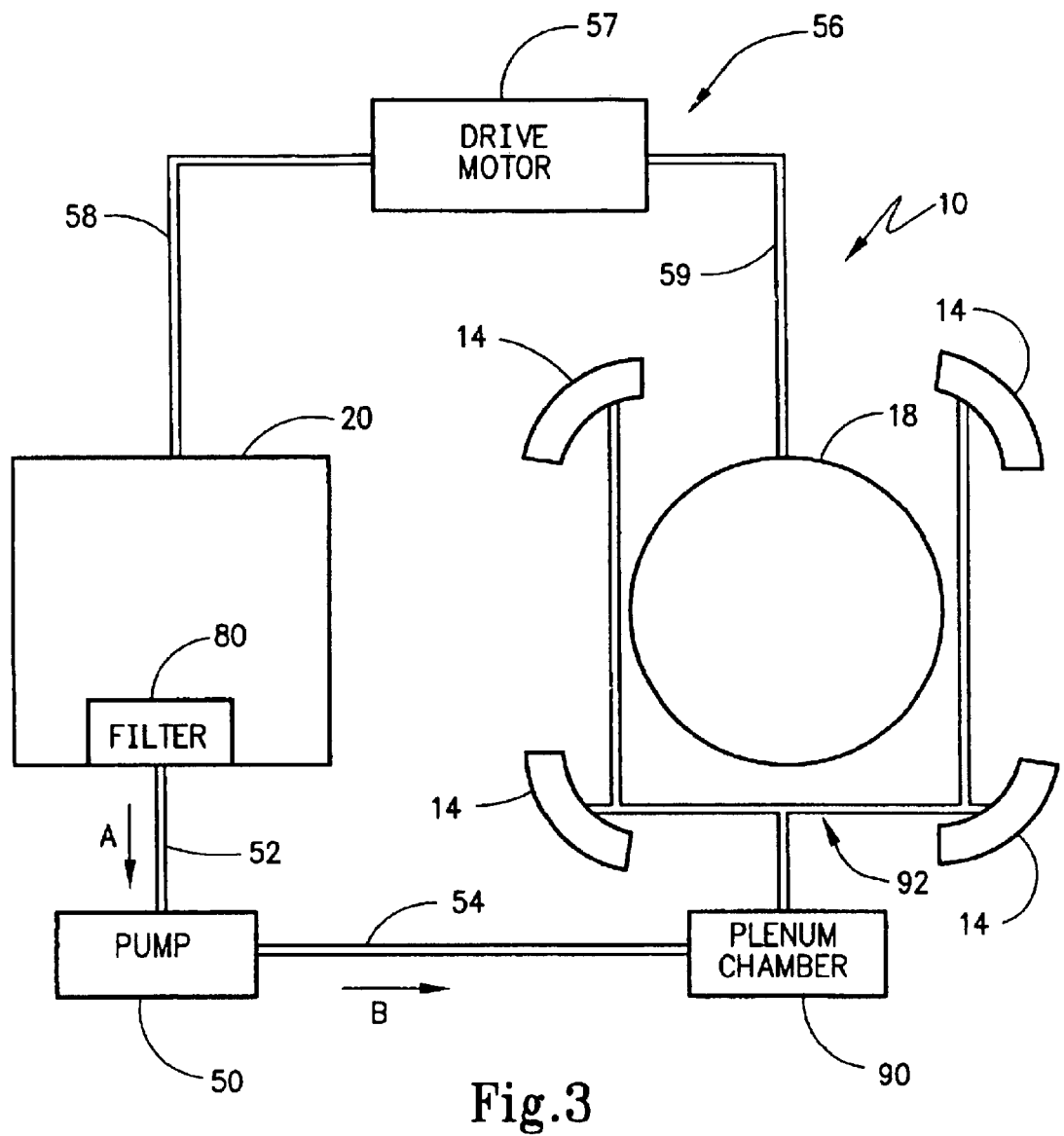
FIG. 3 is a plan view diagrammatically illustrating an air filtration arrangement which may be used as part of the tape transport apparatus in FIGS. 1 and 2.

Reference is now made to the diagrammatic view of FIG. 3 to illustrate how air filtration can be accomplished for a tape transport apparatus, such as that shown in FIGS. 1 and 2. As shown, a suitable drive assembly 56 may include at least one drive motor 57 which is coupled, respectively, to each of data storage tape cartridge 20 and take-up reel 18 by appropriate linkages 58 and 59 in any known manner. Disposed in data storage tape cartridge 20 is an appropriately sized and configured filter 80 which is in communication with the inlet line 52 of pump 50 such that ambient air may be drawn through the internal filter and directed to pump 50 in the direction of arrow "A". This filtered air is then pressurized by pump 50 and directed to each of air bearings 14 by virtue of air pump 50 being interposed in fluid communication between filter 80 and air bearings 14. More specifically, the filtered air may be directed along the pump's outlet line 54 in the direction of arrow "B" to a suitably constructed plenum chamber 90, after which it is passed to each air bearing 14 by suitably branched air conduits 92. While FIG. 3 is only representative diagrammatically of the drive assembly 56 and the air bearing technology (including plenum chamber 90, air bearings 14 and conduits 92) for tape transport apparatus 10, reference may again be made to U.S. Pat. No. 5,777,823 which teaches how these various components can be configured, as well as the provisions of various sensors and controllers which may be used in conjunction with them.

Figure 4A:
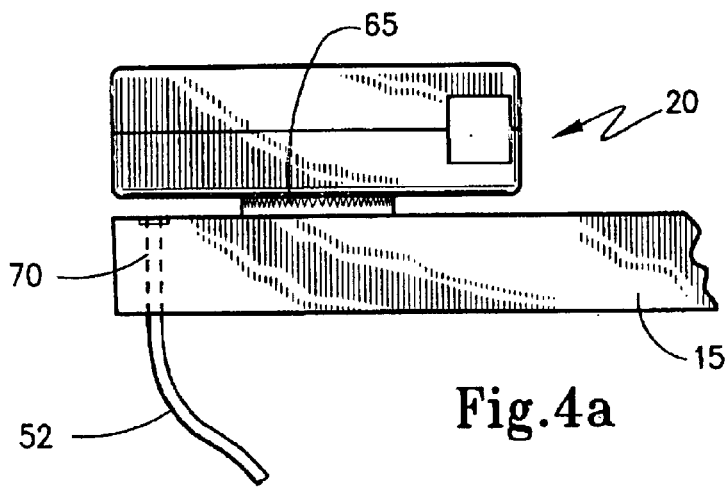
FIG. 4(a) is a partial side view in elevation diagrammatically illustrating a data storage tape cartridge, such as the one shown in FIGS. 1 and 2, in a pre-docked position on the tape transport apparatus.
Figure 4B:
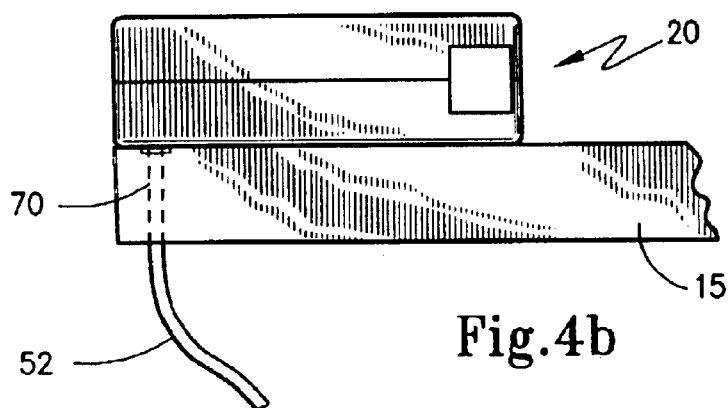
FIG. 4(b) is a partial side view in elevation diagrammatically illustrating the data storage tape cartridge of FIG. 3(a) in a docked position.
Figure 5:
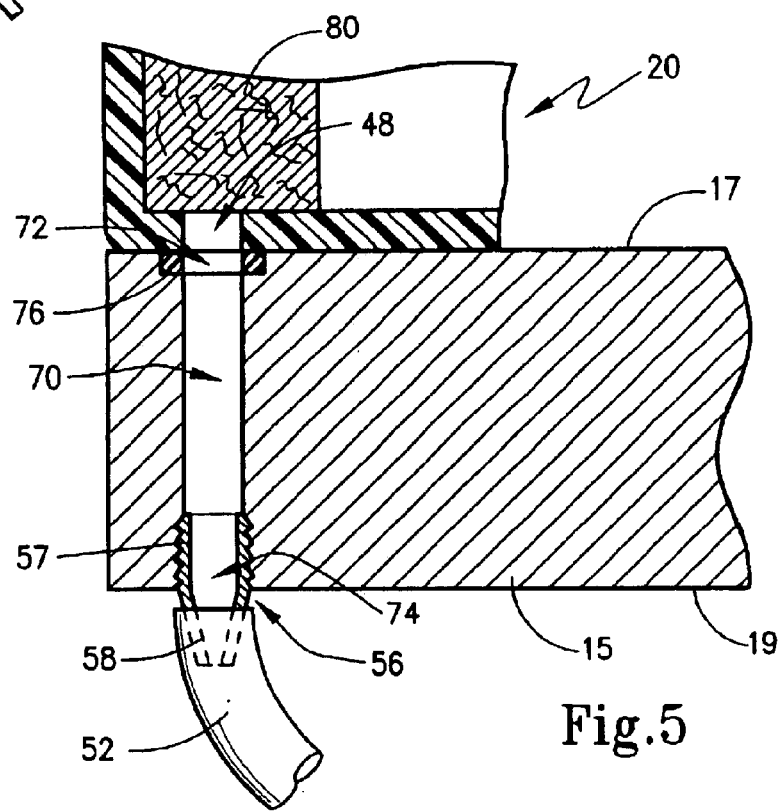
FIG. 5 is an enlarged partial side view in elevation and in cross-section showing the interface between the base plate and the data storage tape cartridge when it is in the docked position of FIG. 3(b)
Figure 6:
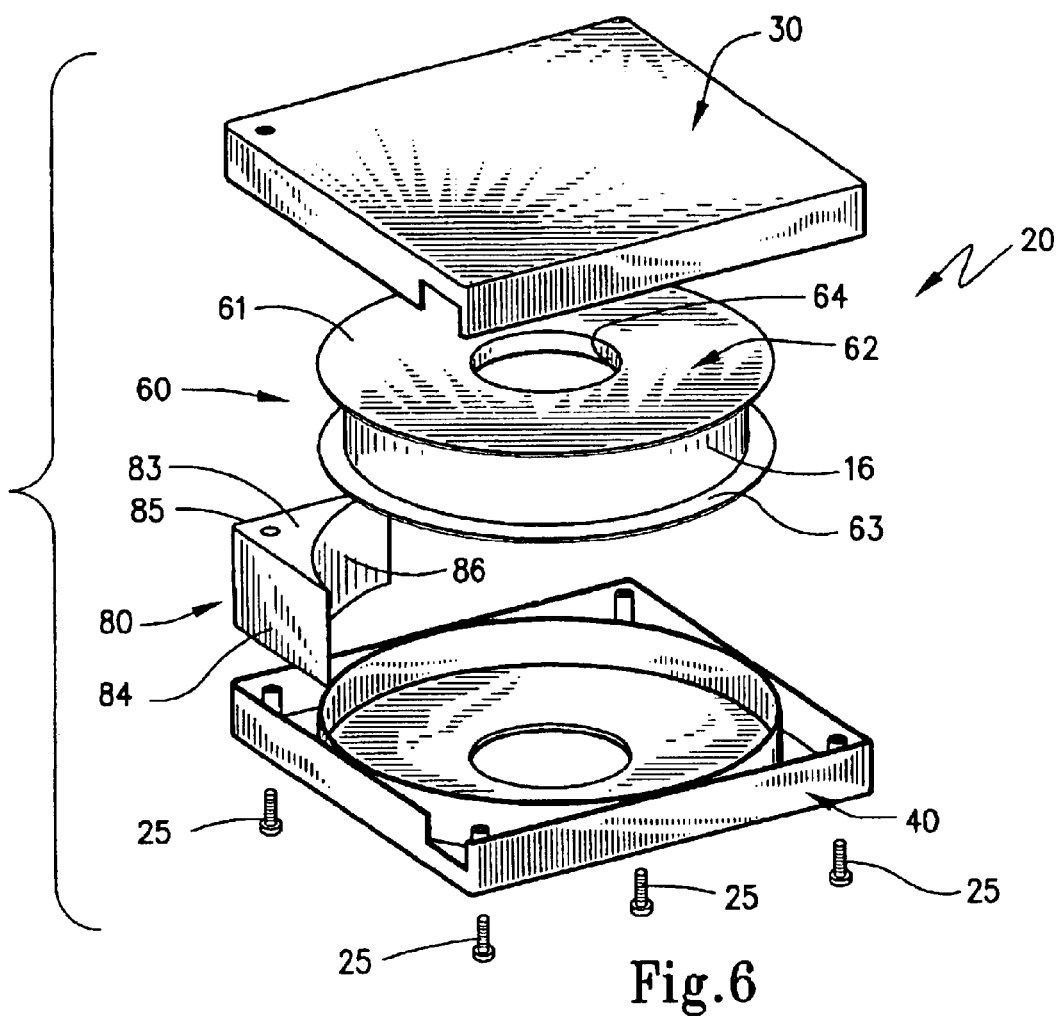
FIG. 6 is an exploded perspective view of the data storage tape cartridge shown in FIGS. 1–3, to illustrate one possible simplified construction thereof.

An exemplary interface between the pump and the data storage tape cartridge may now be appreciated with reference to FIGS. 4(a)–(b) and 5. FIG. 4(a) illustrates tape cartridge 20 in a loaded but pre-docked position relative to the base plate 15 tape transport apparatus. That is, this figure represents the position of tape cartridge 20 after it has been inserted into a tape drive bay just prior to the docked state. Many tape drives incorporate some type of toothed clutch, such as clutch 65, which engages the tape cartridge 20 when it is in the docked position shown in FIGS. 4(b) and 5.

Base plate 15 preferably has a countersunk bore 70, such as a ⅛ inch drilled hole, extending therethrough between it's opposed upper and lower surfaces 17 and 19, respectively. This bore 70 is positioned to align with correspondingly sized outlet port 48 formed through a wall of tape cartridge 20, preferably in close proximity to its internal stored filter 80. To allow for a sealing engagement between the bore 70 of base plate 15 and outlet 48, a resilient O-ring 76 is provided which is sized and adapted to be received in the enlarged countersunk region 72 of bore 70. Accordingly, the downward movement of tape cartridge 20 as it becomes docked compresses the seated O-ring 76 to provide a sealed arrangement between the lower surface of the tape cartridge 20 and the upper surface 17 of base plate 15, and thereby prevent leakage of air as it is drawn through the filter to the pump's inlet line 52.

As best shown in FIG. 5, the pump's inlet line 52, which may be either a flexible or rigid tube, is placed in communication with bore 70 via a threaded nipple 56 having threads 57 which are sized and adapted to engage a correspondingly threaded lower portion 74 of bore 70. Inlet line 52 is then fitted over a tapered lower end portion 58 of nipple 56. Of course, the ordinarily skilled artisan should readily appreciate that FIGS. 4(a)–5 only illustrate one possible construction for interfacing the inlet of the pump to the tape cartridge 20 and the invention should not be unduly limited to that which is particularly described in the figures. Rather, it should be appreciated that the present invention is intended to encompass any manner by which an appropriately constructed tape cartridge having an associated filter is placed in fluid communication with a pump or other appropriate device that is operative to draw ambient air through the filter to produce filtered air for distribution to appropriate components of a tape transport apparatus.

Having discussed the principal features of a tape transport apparatus according to the present invention, a first exemplary embodiment for a data storage tape cartridge for use therewith is shown in FIGS. 6–10. Broadly, the data storage tape cartridge is one that is adapted to be mounted in and demounted from a tape transport apparatus and comprises a housing having an opening formed therethrough in communication with a housing interior, a filter disposed in the housing interior proximate to the opening and a data storage tape stored in the housing interior. One exemplary embodiment of such a tape cartridge, and particularly the data storage tape cartridge 20 shown in previous figures, is depicted. Data storage tape cartridge 20 has a housing 22 formed by a cover piece 30 and a base piece 40 which are connectable to one another to substantially enclose a housing interior 24. Cover piece 30 and base piece 40 are preferably rigid, molded plastic pieces which are configured to mate with one another and be secured together by screws 25 which extend through aligned openings 28 and 29, respectively, formed in cover piece 30 and base piece 40. Alternatively, these pieces can be secured together through sonic welding or an appropriate snap-fit arrangement, or in any other manner known in the art. Stored within the housing interior 26 of data storage tape cartridge 20 is a tape reel assembly which stores the tape medium 16.

Figure 7:
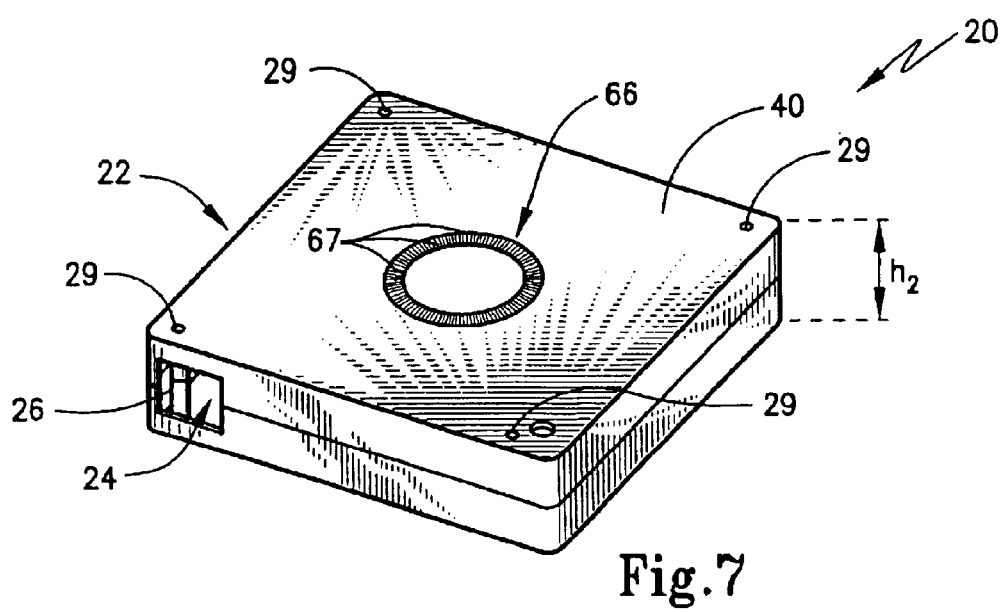
FIG. 7 is a perspective view showing the bottom of the data storage tape cartridge of FIG. 6.

A tape-reel assembly 60 broadly includes a spool 62 which includes opposed upper and lower flanges 61, 63 and a central hub 64 about which the tape medium 16 is wound. As shown in FIG. 7, also associated with tape reel assembly 60 is a circumferential gear 66 having a plurality of gear teeth 67 which are sized and adapted to engage the clutch 65 of the tape transport apparatus' drive assembly (FIG. 4(a)) when the data storage tape cartridge 20 is in its docked position. Cover piece 30 and base piece 40 also have appropriate portions of their associated sidewalls removed to create an access window 26 to permit capture of and return of a leader block assembly (not shown) disposed on an end of the tape medium 16 as data storage tape cartridge 20 is being used. The ordinarily skilled artisan will readily appreciate that a variety of known types of reel assemblies and leader block assemblies can be employed for the purpose of storing the wound tape medium 16 within housing 22, while permitting the tape medium 16 to be wound and unwound from hub 64. An example of one such construction for a tape reel assembly and leader block assembly is disclosed in U.S. Pat. No. 6,311,916 to Johnson et al. dated Nov. 6, 2001, the disclosure of which is incorporated herein by reference. Accordingly, the various components which may be housed within the housing 22 of data storage tape cartridge 20 are not described in detail herein, as their construction would be well understood to those skilled in the art.

Figure 8:
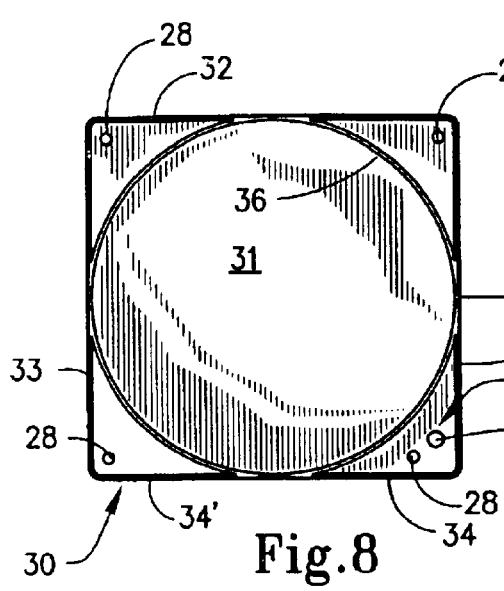
FIG. 8 is a plan view showing the inside for the cover piece of the data storage tape cartridge of FIGS. 6 and 7.
Figure 9:
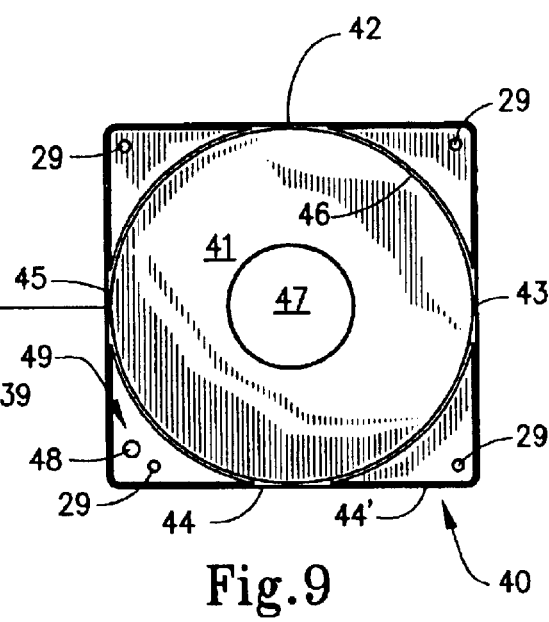
FIG. 9 is a plan view showing the inside for the base piece of the data storage tape cartridge of FIGS. 6 and 7.
Figure 10:
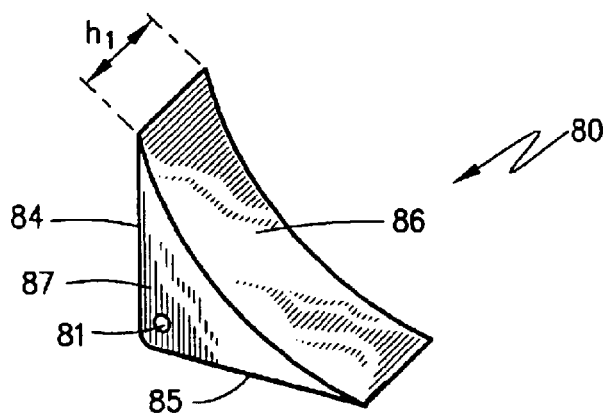
FIG. 10 is a perspective view of the air filter for the data storage tape cartridge of FIGS. 6 and 7.

The constructions for cover piece 30 and base piece 40 may best be appreciated with reference to FIGS. 8 and 9, respectively. Each of these sections is preferably rectangular in configuration. As such, cover piece 30 shown in FIG. 8 includes a rectangular cover panel 31 and a plurality of cover piece sidewalls 32–35 projecting therefrom. Opposed sidewalls 32 and 34 are parallel to one another and adjoined by opposed, parallel sidewalls 33 and 35. Sidewall 34 has a cut out region 34' to create half of the access window 26 for the tape cartridge 20 when cover piece 30 and base piece 40 are assembled. Also projecting from cover panel 31 is a circumferential wall 36 which is tangent to each of sidewall portions 32–35 to create a boundary wall for storage of the tape cartridge's spool. Cover piece 30 may also include an opening 38 formed through a corner region 39 of its cover panel 31 to create an inlet for the passage of air during use.

Base piece 40 is similarly configured to cover piece 30 so that it also includes an associated base panel 41, base panel sidewalls 42–45 and circumferential boundary wall 46 tangent thereto. Base panel sidewall 44 also has a cut out 44' which, together with cut out 34' associated with cover piece 30 defines the access window 26 for the tape cartridge 20. Preferably also, the base panel 41 for base piece 40 has an associated second opening 48 formed in an associated corner region 49 thereof to define an air outlet during use of the tape cartridge. A central opening 47 is formed through base panel 41 to allow a tape drive's clutch to engage the gear teeth 67 of the tape cartridge's gear 66.

With reference again to FIG. 6, filter 80 is may be a wedge-shaped body which is received in a storage region generally defined, together, by the corner regions 39 and 49 of the cover and base, respectively. Accordingly, filter 80 is preferably disposed within the housing's interior 24 and interposed between air inlet 38 and air outlet 48. More particularly, as appreciated with reference to FIGS. 6 and 10, filter 80 includes a pair of side surfaces 84 and 85 which are oriented in facing relationship, respectively, to walls 34, 44 and 35, 45 of the cover and base pieces when they are joined. Filter body 80 also includes an arcuate wall 86 extending between walls 84 and 85 and confronting the spool boundary walls 36 and 46 when the tape cartridge is assembled.

Although not necessary, preferably, the height "$h_1$" of filter 80 is at least the same as the height "$h_2$" of the tape cartridge 20 so that filter 80 can be disposed therein in a somewhat compressed state to fill the storage region. As such, an upper wall 83 of filter 80 becomes oriented in a close facing relationship to cover panel 31, while a lower, generally triangular wall 87 becomes oriented in close facing relationship to base panel 41. As such, walls 83 and 87 are also, respectively, positioned proximate to the air inlet 38 and air outlet 48. Since each of cover piece 30 and base piece 40 may have upstanding molded projections, 28 and 29, respectively, which are alignable with one another for receipt of a fastening screw 25, filter 80 may optionally also have a correspondingly sized opening 81 extending therethrough between surfaces 83 and 85 for accommodating these projections. This, however, is not deemed to be necessary since the mere fastening of the cover piece 30 to the base piece 40 would serve to puncture the filter along these molded projections in any event. Moreover, it is contemplated that the filter could be placed in a storage region of a cartridge which is free of any kind of obstruction so that no hole would be needed and it would not be punctured upon assemblage.

It should be appreciated that FIGS. 6–10 only illustrate one possible construction for a filter as well as the air inlets and outlets which may be associated with a data storage tape cartridge according to the present invention. Indeed, it is desirable, although not necessary, that the filter 80 be located in a confined storage region formed by corner regions of the cover and base pieces and have a geometric configuration which is generally congruent therewith. It is likewise not necessary that there even be an air inlet opening, such as opening 38 formed through the cover piece 30, since the tape access window 26 of the cartridge could just as easily serve as an inlet for ambient air which is drawn through the filter and the cartridge's outlet by the pump discussed above. A more important consideration, rather is that the filter be interposed between any opening which can serve as an air inlet, yet in close proximity to an air outlet opening such that ambient air is drawn through the filter and passed directly through the outlet opening for use by the tape transport apparatus. As for the particular filtering characteristics associated with filter body 80, it is preferably at least a 1 $\mu$m particle size filter of any appropriate size and shape and formed from any suitable material, such as one which is akin to those commonly used for cigarette filters.

Figure 11:
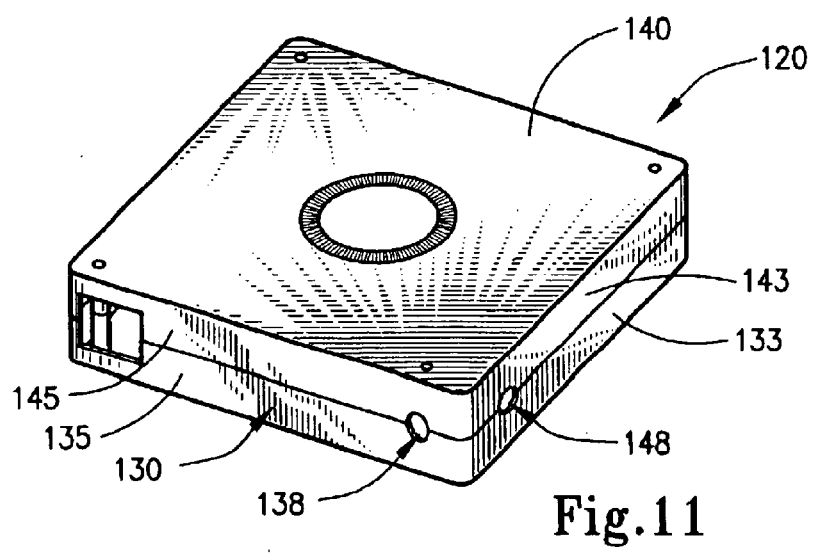
FIG. 11 is a perspective view showing a secondary exemplary embodiment for a data storage tape cartridge according to the present invention.

FIG. 11 is provided to illustrate one possible alternative construction for a data cartridge 120 which is identical to data cartridge 20 discussed above, with the exception that, here, air inlet and/or air outlet locations 138 and 148 can be formed through appropriate junctions between the sidewalls 135, 145 and 134, 144 of the cover piece 130 and base piece 140. That is to say, either one or both openings 138 and 148 can serve as either air inlet or outlet locations, as desired. Accordingly, the ordinarily skilled artisan should readily appreciate that any of a variety of locations and constructions for providing air inlet and air outlet locations are contemplated, without restriction to the particular manners in which they are shown herein.

Having discussed various possible embodiments for a data storage cartridge according to the present invention, it should be readily appreciated that any of a variety of known data cartridge formats for use with various form factor drives, such as a 5.25—inch or 3.5—inch form factor drive or other useful sizes either now known or hereafter developed may utilize such a filtering principal. It is believed that this concept will find particular use with magnetic tape cartridges and their associated drives since magnetic tape remains a highly desirable format for archiving data. Accordingly, such magnetic tape cartridges are typically only used a limited number of times so that incorporation of a filter body into the cartridges permits, either alone or in conjunction with other more permanent filters associated with the tape transport apparatus, the ability to filter particles so that they do not contribute to contaminating the operating environment, thereby reducing or eliminating the maintenance operation of replacing a system filter over the life of a drive.

With this in mind, another exemplary embodiment of a magnetic tape storage cartridge incorporating a filter according to the present invention is shown in FIGS. 12–16. These figures are generally representative of a linear tape open (LTO®) format data storage tape cartridge available from Imation Corporation of Oakdale, Minn., the particular features of which are more particularly described with reference to U.S. Pat. No. 6,345,779 to Rambosek dated Feb. 12, 2002. Data storage tape cartridge 220, as with data storage tape cartridge 20 discussed above, is also comprised of a cover piece 230 and a base piece 240 which are operatively connected to one another. These pieces are also generally rectangular plastic sections having associated sidewall portions 232–235 and 242–245, respectively, as best shown in FIGS. 13 and 14. Tape cartridge 220 also has an associated internal reel assembly, generally represented by numeral 260, which supports a tape medium 216. As may be seen particularly in FIGS. 13 and 14, the construction for the cover piece 230 and the base piece 240 associated with cartridge 220 are more involved for a variety of reasons. Cartridge 220 is an LTO (linear tape open) format cartridge having a variety of additional capabilities which may be desirable. As with tape cartridge 20, tape cartridge 220 has a corner region, generally represented by the numeral 221 in FIG. 12, provided with an access region for placement and capture of a leader pin assembly. A second corner region 222 is specified to house the cartridge memory chip, while a third corner region 223 is intended to incorporate a write inhibit mechanism having an associated write protection switch. A fourth corner region 224 serves the purpose of preventing mis-insertion of the cartridge into the drive.

Despite the additional capabilities associated with tape cartridge 220, however, it is believed that one or more appropriately configured filters, such as filters 280 and 290, can nonetheless be configured for use in tape cartridge 220. For example, a filter 280, as best shown in FIGS. 12 and 15, can be appropriately constructed for placement into corner region 224 such that it does not interfere with the structural capabilities of the tape cartridge 220. More particularly, filter 280 may be formed to include appropriately sized and configured notched or cut out regions 282–285 for accommodating the various molded projections associated with cover piece 230 and 240 to prevent interference therewith and disruption of the working capabilities of tape cartridge 220. Similarly and alternatively, a filter such as filter 290 shown in FIGS. 12 and 16 can be configured with notches and cutouts 292–294 for placement into a storage area define by corner region 223 provided it does not interfere with the write inhibit mechanism that would also be associated with cartridge 220. Indeed, it is contemplated that another optional placement location for a filter, and indeed a location which is perhaps preferred for such a tape cartridge 220, is corner region 222. Regardless of where the filter body is situated, it is again preferred that it at least be in close proximity to an appropriate air outlet, such as opening 248 formed in base piece 240 (FIG. 14), such that air can be conveniently drawn therethrough for use by a tape transport apparatus.

With an appreciation of the foregoing, the present invention also contemplates a method of supplying filtered air to a tape transport apparatus that is adapted to receive a tape medium from a data storage tape cartridge and to transport the tape medium in a transport direction in order to read/write data thereon. Broadly, this methodology comprises drawing ambient air through a filter disposed within the data storage tape cartridge to produce filtered air and directing the filtered air into an interior of the tape transport apparatus. This methodology finds particular use in a tape transport apparatus, such as that discussed herein, which incorporates air bearings for creating a cushion of air across which the tape medium is transported. In this particular application, the filtered air may be pressurized by an air pump and directed via a plenum chamber through each air bearing surface.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A tape transport apparatus adapted to receive a tape medium and to transport the tape medium in a transport direction in order to read/write data thereon, comprising:
   a. a transducer operative to read/write data on the tape medium;
   b. a plurality of air bearings each positioned on a respective side of said transducer and having a respective air bearing surface;
   c. a tape cartridge for storing said tape medium, said tape cartridge including:
      (i) a housing having an inlet port and an outlet port; and
      (ii) a filter interposed in the housing between said inlet and outlet ports;
   d. an air pump interposed in fluid communication between said outlet port and each respective air bearing surface, said air pump operative to draw ambient air through said filter via said inlet port to produce filtered air and to direct the filtered air through each respective air bearing surface to produce a cushion of air, and
   e. a tape drive operative to advance the tape medium in the transport direction across said air bearings and said transducer such that said tape medium is supported on said cushion of air.

2. A tape transport apparatus according to claim 1 including a base plate for supporting said tape cartridge, said base plate having an air passageway formed therethrough which is adapted to be placed fluid communication between said outlet port and said pump when said tape cartridge is in a docked state on said tape transport apparatus.

3. A tape transport apparatus according to claim 2 including a seal element disposed in said passageway and adapted to provide sealing engagement between said base plate and said outlet port when said tape cartridge is in the docked state.

4. A tape transport apparatus according to claim 3 wherein seal element is an O-ring.

5. A tape transport apparatus according to claim 1 including a plurality of airflow conduits interconnecting said air pump in fluid communication between said outlet port and each respective air bearing surface.

6. A method of supplying filtered air to a tape transport apparatus that is adapted to receive a tape medium from a tape cartridge and to transport the tape medium in a transport direction in order to read/write data thereon, wherein said tape transport apparatus includes a transducer operative to read/write data on the tape medium, a plurality of air bearings each positioned on a respective side of said transducer and having a respective air bearing surface, a pressurized air source operative to supply pressurized air to said air bearings, and a tape drive operative to advance said tape medium in the transport direction on a cushion of air across said air bearings and said transducer, said method comprising:
   a. drawing ambient air through a filter disposed within the data storage tape cartridge to produce filtered air; and
   b. directing the filtered air through the respective air bearing surface of each of said air bearings to produce said cushion of air.

7. The method according to claim 6 including pressurizing the filtered air with an air pump before to directing the filtered air through each respective air bearing surface.

8. The method according to claim 7 including passing filtered air at an outlet of said air pump into a plenum chamber before directing the filter air through each respective air bearing surface.

* * * * *